United States Patent
Ishii et al.

(10) Patent No.: US 7,085,672 B2
(45) Date of Patent: Aug. 1, 2006

(54) SURVEYING APPARATUS WITH NETWORK COMMUNICATIONS

(75) Inventors: Hiroshi Ishii, Atsugi (JP); Katsuaki Shimizu, Atsugi (JP)

(73) Assignee: Sokkoia Company Limited, Kanagawa (JP)

(*) Notice: Subject to any disclaimer, the term of this patent is extended or adjusted under 35 U.S.C. 154(b) by 32 days.

(21) Appl. No.: 10/375,042

(22) Filed: Feb. 28, 2003

(65) Prior Publication Data

US 2003/0220764 A1    Nov. 27, 2003

(30) Foreign Application Priority Data

Mar. 8, 2002  (JP)  .............................. 2002-062930
Feb. 18, 2003  (JP)  .............................. 2003-039927

(51) Int. Cl.
*G01C 9/00* (2006.01)
(52) U.S. Cl. ...................... 702/150; 702/151; 702/152; 702/153
(58) Field of Classification Search ........ 702/150–153, 702/189, 158–159; 701/207, 213, 225, 214, 701/215, 301; 359/189, 834; 342/357.01; 455/254

See application file for complete search history.

(56) References Cited

U.S. PATENT DOCUMENTS

| 5,467,290 | A | | 11/1995 | Darland et al. | |
|---|---|---|---|---|---|
| 5,767,952 | A | * | 6/1998 | Ohtomo et al. | 356/4.01 |
| 5,970,400 | A | * | 10/1999 | Dwyer | 455/254 |
| 6,034,722 | A | * | 3/2000 | Viney et al. | 348/135 |
| 6,434,508 | B1 | * | 8/2002 | Lin et al. | 702/153 |
| 6,587,244 | B1 | * | 7/2003 | Ishinabe et al. | 356/4.01 |

FOREIGN PATENT DOCUMENTS

| JP | 8-285600 | 11/1996 |
|---|---|---|
| JP | 10-267656 | 10/1998 |

OTHER PUBLICATIONS

Annis et al; "The Sloan Digital Sky Survey Data Acquisition system early result"; Real Time Conference, 1999 11th NPSS.*

* cited by examiner

*Primary Examiner*—John Barlow
*Assistant Examiner*—Stephen J. Cherry
(74) *Attorney, Agent, or Firm*—Thomas W. Cole; Nixon Peabody LLP

(57) ABSTRACT

A surveying apparatus is provided that includes devices for measuring a range and angle of a point, a processor for processing results of a location survey from the range and angle measurements, a memory for storing the processed data of the location survey, a transmitter, such as a mobile phone, for transmitting the processed data to a communications object connected to a communications network, such as the Internet, in compliance with a communications protocol, and a receiver that receives the survey data in compliance with the communications protocol. The apparatus allows survey data from different surveying devices to interact bi-directionally via the Internet.

8 Claims, 4 Drawing Sheets

FIGURE 2

| Total Station Control Program | ~ 32 |
| Network. Com. Program | ~ 34 |
| TCP/IP Stackware | ~ 36 |
| PPP Control Software | ~ 38 |
| Dial-up Control Software | ~ 40 |
| Network Device Driver | ~ 42 |

SURVEYING APPARATUS WITH NETWORK COMMUNICATIONS

The present invention relates to a surveying apparatus for measuring the range and angle of a measurement point, and in particular, a surveying apparatus that is preferable for processing survey data, which are obtained by a location survey, as communications data.

BACKGROUND OF THE INVENTION

Stations for measuring the range and angle of a measurement point are known in the prior art. When carrying out a survey using this type of surveying apparatus, several methods are employed. In one such method, a surveying apparatus is directly connected to a post-processing personal computer via a communications cable and transfers data regarding a survey to the post-processing personal computer via a communications cable. In another method, survey data obtained by the surveying apparatus is stored in a memory card or an electronic notebook (or data collector) and transferred to a post-processing personal computer via a communications cable.

However, where any one of these methods is employed, unless an operator takes a surveying apparatus, a memory card, and an electronic notebook and moves back and forth between a site and an office in which a post-processing personal computer is provided, it is impossible to obtain the survey data and coordinate data necessary for surveying work.

Therefore, as described in, for example, Japanese Unexamined Patent Publication No. Hei-8-285600, a method for converting survey values obtained by a survey to image data and transmitting the converted image data to a facsimile device via a telephone network has been proposed as that for collecting data without reciprocating hardware, which is provided as a data recording medium, between a site and an office.

According to the surveying apparatus, it is possible to transmit data regarding the survey values from a site to a facsimile apparatus that is remote therefrom, via a telephone network. However, since the communications direction of the data is limited to one way, it is not possible to transmit data from the office side, where a facsimile is installed, to a work site.

Accordingly, as described in, for example, Japanese Unexamined Patent Publication No. Hei-10-267656, such an apparatus that is able to carry out bi-directional data communications has been proposed, by which bi-directional data communications are made available between a centralized processing device acting as the master station and a plurality of surveying apparatuses acting as client stations.

In the above-described prior arts, although it is possible to carry out bi-directional data communications between a centralized processing device and a plurality of surveying apparatuses, it is not possible to carry out bi-directional data communications between the surveying apparatuses. That is, in the above-described prior arts, although bi-directional data communications can be carried out between a master station and client stations, no bi-directional data communications can be executed between the client stations, wherein the range of utilization thereof is limited.

SUMMARY OF THE INVENTION

The present invention was developed in view of the aforementioned problems associated with the prior art. It is therefore an object of the invention to provide a surveying apparatus capable of widening the range of communications objects that are able to transmit and receive data regarding a survey.

In order to achieve the above-described object, the invention is provided with surveying means for measuring the range and angle of a point to be measured; means for processing results of a location survey, which are brought about by a survey of the above-described surveying means; means for storing the results of processing made by the above-described processing means; means for transmitting the results of the processing made by the above-described processing means to a communications object connected to a communications network as data regarding a survey on an application in compliance with a communications protocol regulated for the above-described communications network; and means for receiving the data regarding a survey on the above-described application in compliance with the above-described communications protocol from the above-described communications object; wherein the above-described processing means processes data regarding the survey, which are received by the above-described receiving means.

When a result of a survey, which is obtained by measuring the range and angle of a measurement point, is processed, the processed result is transmitted to a communications object connected to a communications network as data regarding a survey on an application in compliance with a communications protocol regulated for the above-described communications network. At the same time, the data regarding the survey is received from the communications object connected to the communications network and processed. It is therefore possible to transmit data regarding survey to all the communications objects connected to the communications network and receive the data therefrom, wherein it is possible to widen the range of communications objects that transmits data regarding a survey and receives the same.

The invention is constructed so that the above-described communications network is the Internet, and the above-described communications protocol is an Internet protocol.

Since data are transmitted and received by utilizing the Internet as a communications network with the communications protocol made into an Internet protocol, all devices that are connected to the Internet can be made into communications objects, wherein it is possible to widen the range of communications objects, to and from which data regarding a survey can be transmitted and received.

BRIEF DESCRIPTION OF THE DRAWINGS

FIG. 2 is a configurational view of a program stored in a ROM;

DETAILED DESCRIPTION OF THE PREFERRED EMBODIMENT

Figure 1:
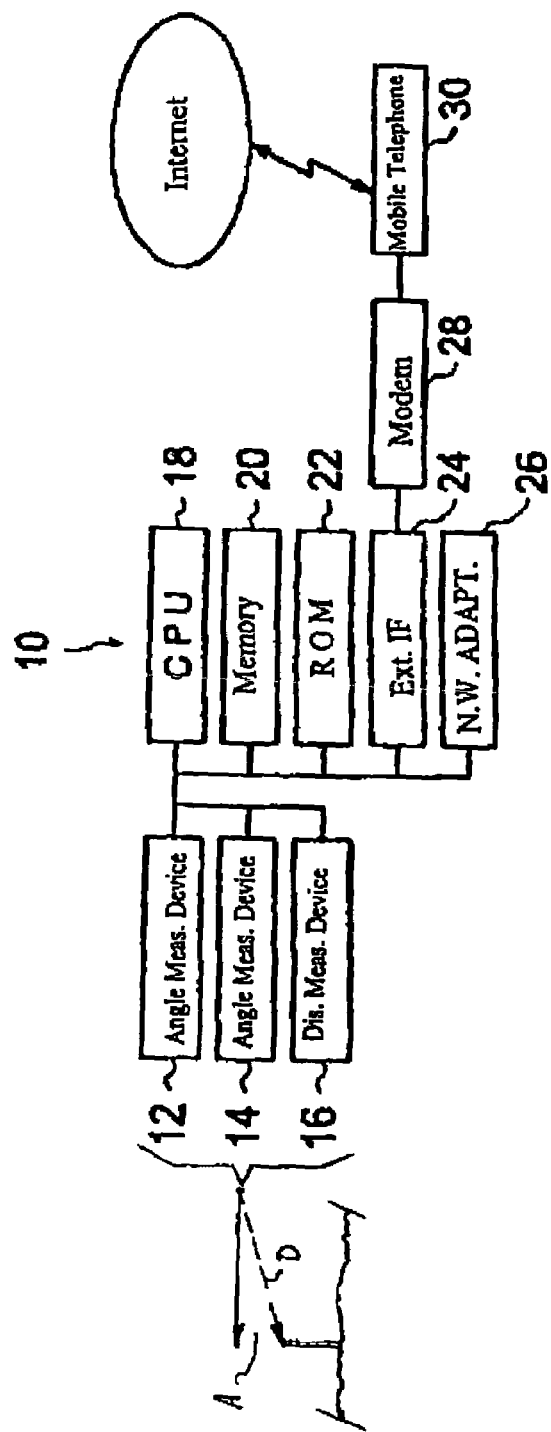
FIG. 1 is a block diagram showing the entire construction of a surveying apparatus according to one embodiment of the invention.

In FIG. 1 and FIG. 2, a surveying apparatus 10 is provided with angle measuring devices 12 and 14, a range measuring device 16, a CPU 18, a memory 20, a ROM 22, an external interface 24, a network adapter 26, a modem 28, and a mobile telephone 30.

When a telescope (not illustrated) is directed to an object of measurement at a measurement point, and the measurement paint is collimated, the angle measuring device 12 is constructed so that, for example, the horizontal angle A thereof is measured at an angle of the measurement point. And, when the measurement point is collimated by the telephone, the angle-measuring device 14 is constructed so that, for example, the perpendicular angle (not shown) thereof is measured as another angle of the measurement point. On the other hand, when the measurement point is collimated by the telescope, the distance-measuring device 16 is constructed so that the distance D from a base point of the surveying apparatus 10 (a point with the apparatus height taken into consideration) to the measurement paint is measured. That is, the angle measuring devices 12 and 14, and distance measuring device 16 are constructed as surveying means that are able to measure the distance D and angle A of the measurement point, and the results of measurement, which are obtained by respective measurement devices are transferred to a CPU 18.

The CPU 18 (which may be, for example, a microprocessor) processes the results of measurement of respective measurement devices on the basis of control programs stored in a ROM 22, and is further constructed as processing means by which the result of measurement is stored in a memory 20.

As shown in FIG. 2, a program 34 for carrying out network communications, TCP (Transmission Control Protocol)/IP (Internet Protocol) stackware 36, PPP (Point-to-Point Protocol) control software 38, dial-up control software 40, and a network device driver 42 are accommodated in the ROM 22 in addition to a total station control program 32 to control a surveying apparatus 10 as a total system.

Also, an external interface 24 is connected to the CPU 18, and a mobile telephone 30 is connected to the external interface via a modem 28. The external interface 24, modem 28 and a mobile telephone 30 comprise transmission means for transmitting the results of processing, which is made by the CPU 18, to a communications object (a server or a provider connected to the Internet) as data (for example, data by electronic mail) regarding a survey on an application in compliance with a communications protocol, for example, the Internet protocol. The mobile telephone 30 is constructed so that data regarding a survey can be transmitted to a mail server of an appointed provider, and another mobile telephone, or a communications object connected to the Internet such as an ftp (File Transfer Protocol) server of a business office in the format of electronic mail.

In the case where data regarding a survey is transmitted by using electronic mail which is an application on the TCP/IP using the mobile telephone 30, the following procedures are employed.

For example, as the results of measurement, which are obtained by, for example, the angle measuring devices 12 and 14 and range measuring device 16, are processed by the CPU 18, a program 34 to carry out network communications is started, and an object to be dialed up, which is registered in advance, is called up from the mobile telephone 30 by processing of the dial up control software 40. The appointed object to be dialed up is called by the mobile telephone, the PPP control software 38 is started, wherein a PPP connection with a computer of the object to be dialed up is carried out by using a log-in name and a password, which are registered in advance, and a connection is made to the Internet as a communications network. After that, by processing of the program 34 to carry out network communications, information such as headers necessary for electronic mail is added to the range-measured data, angle-measured data (that is, observation data) and coordinate data, etc., which are obtained by the respective measurement devices, wherein data (data regarding the survey) are processed in the format of electronic mail. After that, processes are carried out by the TCP/IP stackware 36 and the PPP control software 38. Then, data are transmitted to an appointed mail server on the Internet, to which the mail server is already connected, by using the SMTP protocol, etc.

As data regarding a survey are transmitted via the Internet, electronic mail connected to a mail server that is used at an object side is received at any time by a computer at the object side, for example, another surveying apparatus or an office which is remote therefrom, whereby it is possible to acquire the data regarding a survey obtained at a remote place. At this time, in the office, etc., it is possible to judge whether or not the data regarding a survey is adequate. Where an observation is necessary again, a request for another observation is transmitted by electronic mail or telephone in order to inform an operator at a site of further observation, wherein it is possible to continue survey work without any waste of time.

On the other hand, where survey data necessary for observation are received by using an electronic mail feature, which is an application on the TCP/IP through a mobile telephone 30, the following procedures are employed.

At the transmission side which is remote from a site at which a surveying apparatus 10 is installed, data necessary for the next surveying work are transmitted by electronic mail using a computer at any time in advance.

On the other hand, in the course of processing data regarding a respective survey by the CPU 18 at the surveying apparatus 10 side that is installed at a worksite, the program 34 to carry out network communications is started, an object to be dialed up, which is registered in advance, is called up by controlling the mobile telephone 30 on the basis of processing made by the dial-up control software 40. After the object is called up by telephone, the PPP control software 38 is started, a PPP connection with a computer at the object to be dialed up is made to be connected to the Internet using a log-in name and a password, which are registered in advance. After being connected to the Internet, processes are carried out by the TCP/IP stackware 36 and PPP control software 38 by processing of the program 34 to carry out network communications, and it is checked whether or not electronic mail is reached to an appointed mail server on the Internet, to which the mail server is already connected, by POP3 protocol, etc., and an electronic mail necessary for an operation made by an operator is indicated. The indicated electronic mail is read into the surveying apparatus 10 by the POP3 protocol, and the encoded data are decoded to be converted to data that can be processed by the surveying apparatus 10, and are stored in the memory 20. In this case, the mobile telephone 30, modem 28 and external interface 24 constitute means for receiving data regarding a survey on an application in compliance with the Internet protocol from a communications object.

The data read as electronic mail are processed by the CPU 18, and are utilized for the next observation work (surveying work).

Thus, since an electronic mail feature is used as an application on the TCP/IP in the present embodiment, and the Internet is used as a communications medium (a communications network), it is possible to construct the following system.

Figure 3:
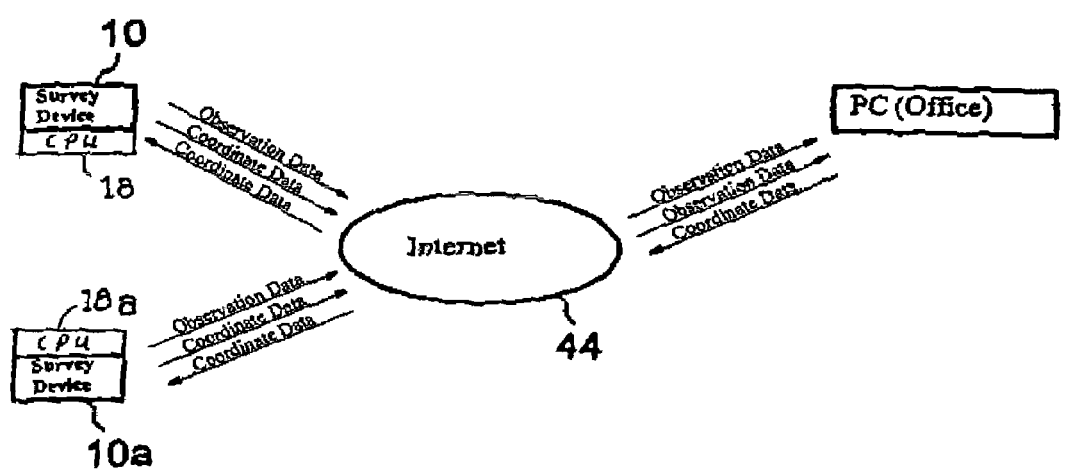
FIG. 3 is a view describing a communications method of data using electronic mail.

For example, as shown in FIG. 3, a surveying apparatuses 10 is connected to another surveying apparatus 10a via the Internet 44, and the surveying apparatuses 10 and 10a having CPUs 18 and 18a are connected to a personal computer installed in a business office via the Internet 44, so that observation data (distance-measured/angle-measured data) and coordinate data (position/altitude data) can be exchanged between the surveying apparatuses 10 and 10a and personal computer. Herein, the observation data and coordinate data are transmitted as an attached file to an appointed mail address via the Internet 44, and the attached file is opened at the receiving side when the electronic mail to which the observation data and coordinate data are attached is received, and the observation data and coordinate data are read, whereby it is possible to obtain data regarding the survey.

When pile driving is taken as an example, first, coordinate data is transmitted as an attached file from the personal computer in the business office to mail addresses of the surveying apparatuses 10 and 10a registered in advance. The surveying apparatuses 10 and 10a receive the incoming mail transmitted to their own mail addresses via the Internet 44, and obtain the coordinate data of the attached file. Next, by use of the obtained coordinate data, the surveying apparatuses 10 and 10a carry out a necessary survey and pile driving and obtain new observation data (and coordinate data, as the case may be). Then, the surveying apparatuses 10 and 10a transmit the newly obtained observation data (and coordinate data, as the case may be) to a mail address of the personal computer in the business office registered in advance. The personal computer in the business office can open the incoming attached file transmitted via the Internet 44, obtain the observation data, calculate new coordinate data by use of this observation data, and supply this coordinate data to the surveying apparatuses 10 and 10a for which the same is necessary.

Thus, according to the present embodiment, since electronic mail is used as an application on the TCP/IP, the Internet 44 is used as a communications medium, and transmission and receiving of the data regarding the survey can be carried out with respect to a communications object connected to the Internet 44, it is possible to widen the range of communications objects to and from which the data regarding a survey can be transmitted and received.

Also it is possible to transmit and receive the data regarding a survey, using ftp and http, etc., as an application on the TCP/IP.

Figure 4:
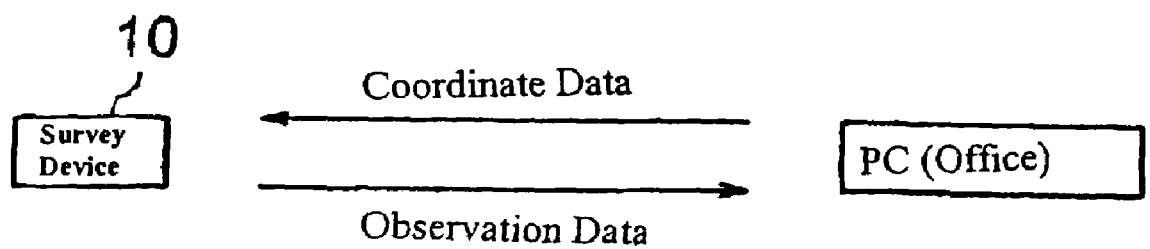
FIG. 4 is a view describing a communications method of data using an ftp server.

For example, where the ftp is used as an application on the TCP/IP, as shown in FIG. 4, a feature for a dialing-up connection to an ftp server is incorporated in a surveying apparatus 10. Data regarding a survey is directly transferred from the surveying apparatus 10 to the ftp server as a file, and a coordinate file provided in the ftp server is read and is stored in a memory 20 of the surveying apparatus, wherein the data may be utilized for a survey for driving piles. Further, data stored in a personal computer PC in an office are retrieved from the surveying apparatus 10 via the ftp server, and the retrieved data may be utilized.

Where a wireless LAN (local area network) other than a mobile telephone is used, first, the program 34 is started, a process to connect a router station of the wireless LAN is carried out via a network device driver 42. At this time, if a necessary mail server is provided in the wireless LAN, it may be used as it is. If a peripheral mail server such as the Internet is used, it is checked whether or not the connected network is connected to the Internet. Then, where the Internet is used for connection with the network, as regards the subsequent procedures, the same process as that used for PPP connection made by the mobile telephone 30 is carried. However, if no PPP connection is required since a direct connection is employed, such an operation is executed, in which the PPP control software 38 is bypassed.

Also, where an FTP protocol other than electronic mail is used, procedures up to connection to the Internet are made the same. After being connected to the Internet, such a process is carried out, in which the data obtained by respective measurement devices are converted in an optional data format by the processing made by the program 34 to carry out network communications. After that, the FTP server established in advance on the Internet to which a connection has already been made is logged in by using the log-in account set in advance via processes of the TCP/IP stackware 36 and PPP control software 38, and a file prepared in an optional data format is transmitted thereto and received therefrom by the FTP protocol, wherein, with respect to a communications object at a remote place, it is possible to transmit data and receive the same during real time almost whenever necessary.

Also, after surveying apparatus 10 or 10a and personal computer PC are connected to a network (the Internet), not only are electronic mail and FTP available but also various types of services can be utilized.

According to the present embodiment, since data regarding a survey can be transmitted by electronic mail, it is not necessary to support the data regarding a survey in a surveying apparatus 10 and in a memory card, wherein an operator is freed from any worry about losing or deleting of data due to a malfunction of hardware. Also, once the data are transmitted, it does not become necessary to store the data in the surveying apparatus 10. Therefore, the memory capacity of the surveying apparatus 10 can be fully utilized.

In addition, since the transmitted data regarding a survey are post-processed in an office even where a surveying apparatus 10 is provided at a site, the surveying apparatus 10 is not removed from the site, wherein a re-survey or a further survey of omitted points may be carried out on the basis of instructions from the office.

Further, by transmitting coordinate data from a surveying apparatus 10 to a mail address of another surveying apparatus, it is possible to copy or duplicate the coordinate data with an operator remaining at a site. Surveying work can be shared, depending on the circumstances. In addition, it is possible to transmit and receive data without providing an exclusive data processing apparatus such as a centralized information processing apparatus.

Also, where an ftp server is used, it is possible to transmit and receive data during real time at any time in comparison with electronic mail. Further, it is possible to check the transmission and receiving of data at the place.

In addition, according to the embodiment, when transmitting and receiving data regarding a survey on an application in compliance with an Internet protocol, the data regarding a survey can be transmitted and received by dialing up by means of a mobile telephone or connecting to the Internet through a wireless LAN, wherein the following effects can be brought about.

Data obtained by a survey can be transferred to a postprocessing computer without accessing the computer to process the data regarding a survey.

Since the data can be received from a computer at a remote place via the Internet when preparing data necessary for observation, it is not necessary to access the place where a computer is provided, with respect to the preparation thereof.

By transferring data to a computer installed at a remote place work by work, it is not necessary to accommodate and store the data in a surveying apparatus which is used for actual surveying, wherein the data can be protected from any unexpected trouble of the surveying apparatus.

By sequentially transferring data to a computer at a remote place, the capacity of acquiring data is not influenced by the performance (capacity) of a specified surveying apparatus, and surveying work can be continuously carried out.

Also, an interface other than RS-232C may be used as an external interface 24, and the ROM 22 is not limited to a ROM, wherein an SRAM or a flash ROM may be used.

As has been made clear in the above description, according to the first aspect of the invention, since data regarding a survey can be transmitted to and received from all communications objects connected to a communications network, the range of communications objects to and from data regarding a survey that can be transmitted and received can be widened.

According to the second aspect of the invention, since all devices connected to the Internet are made into communications objects, it is possible to further widen the range of communications objects to and from which data regarding a survey can be transmitted and received.

PARTS LIST

10 Observation
Coordinate data
10a Coordinate data
12 Angle measuring device
14 Angle measuring device
16 Distance measuring device
18 CPU
20 Memory
22 ROM
24 External interface
26 Network adapter
28 Modem
30 Mobile telephone
32 Total station control program
34 Program for network communications
36 TCP/IP stackware
38 PPP control software
40 Dial-up control software
42 Network device driver
44 Internet

What is claimed is:

1. A surveying apparatus, comprising:
   a land based surveying means for providing a location survey that includes one of observation data and pile driving data, including a distance measuring device and at least one angle measuring device for measuring the range and angle of a selected point on land to be measured, wherein the range is a distance from a base point of the surveying means to the point on land to be measured;
   means for processing said data into processed observation data, which are brought about by a survey by said surveying means;
   means for storing said processed data made by said processing means;
   means for transmitting the processed data made by said processing means to a remotely located communications object connected to a communications network as processed observation data regarding a land survey on an application in compliance with a communication protocol regulated for said communications network; and
   means for receiving data for conducting a next survey in compliance with said communications protocol from said remotely located communications object,
   wherein said processing means further executes said next survey in compliance with said data received by said receiving means,
   wherein said communications object is a processor in a second said land based surveying means.

2. The surveying apparatus according to claim 1, wherein said communications network is the Internet, and said communications protocol is an Internet protocol.

3. The surveying apparatus of claim 1, wherein said data necessary for conducting a next survey is dependent upon said processed data transmitted to the communications object.

4. The surveying apparatus of claim 1, wherein said means for transmitting said survey results and said means for receiving said necessary data are a same means.

5. The surveying apparatus of claim 4, wherein said means for transmitting and receiving includes an external interface, a modem and a mobile telephone.

6. The surveying apparatus according to claim 1, wherein said data for conducting a next survey is coordinate data.

7. A surveying system comprising the survey apparatus of claim 6, and a computing means for receiving observation data from said transmitting means, and for generating said coordinate data for conducting said next survey.

8. A surveying apparatus, comprising:
   a land based surveying means for providing a location survey that includes observation data, including a distance measuring device and at least one angle measuring device for measuring the range and angle of a selected point on land to be measured, wherein the range is a distance from a base point of the surveying means to the point on land to be measured;
   means for processing said observation data, which are brought about by a survey by said surveying means;
   means for storing processed observation data made by said processing means;
   means for transmitting the processed data by said processing means to a remotely located communications object connected to a communications network as processed data regarding a land survey on an application in compliance with a communication protocol regulated for said communications network; and
   means for receiving the data for conducting a next survey in compliance with said communications protocol from said remotely located communications object, said next survey data being dependent upon data obtained from said results of said location survey,
   wherein said processing means further executes said next survey in compliance with said data received by said receiving means, and
   wherein said communications object is one of a computer processor in a second said land based surveying means.

* * * * *